Sept. 22, 1970   B. A. VICARS   3,529,500
MACHINE TOOLHOLDER
Filed June 7, 1968

INVENTOR.

BILLY A. VICARS

United States Patent Office 3,529,500
Patented Sept. 22, 1970

3,529,500
MACHINE TOOLHOLDER
Billy Archibald Vicars, 18804 Laxford Road,
Covina, Calif. 91722
Filed June 7, 1968, Ser. No. 735,268
Int. Cl. B23b 29/24
U.S. Cl. 82—36                                1 Claim

ABSTRACT OF THE DISCLOSURE

A special toolholder having a shank with a shoulder upon it which bears against an elongated and grooved plate member, the plate member having a tong which is received within a groove of a left-hand and a right-hand member. The left- and right-hand members facilitating the holding of cutting tools are adjustable in position to the plate member by threaded bolts. The threaded bolts are secured within a threaded opening of the left-hand and right-hand members while the upper portion of the bolts are free to move within slots of the plate member until the bolts are tightened down against washers which bear against the plate member.

---

This invention relates to machine tools, and more particularly to a special toolholder for machines.

It is therefore the main purpose of this invention to provide a toolholder which will have a slotted plate member which is secured to a shank, the shank serving to hold the toolholder in place upon a machine.

Another object of this invention is to provide a toolholder which will have a left-hand and a right-hand member spaced apart and secured by bolts means to the plate member of the toolholder, the left-hand and right-hand members having grooves.

Other objects of the present invention are to provide a machine toolholder which is simple in design, inexpensive to manufacture, rugged in construction, easy to use and efficient in operation.

These and other objects will be readily evident upon a study of the following specification together with the accompanying drawing wherein.

Figure 1:
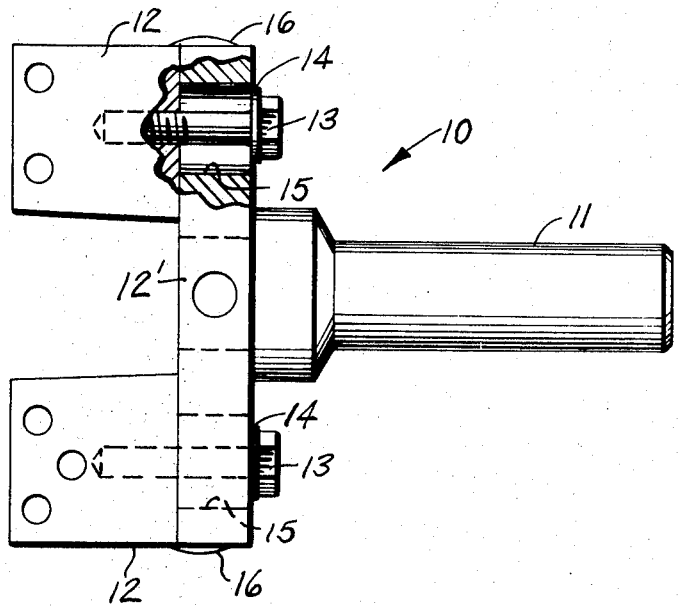
FIG. 1 is a plan view of the present invention.
Figure 2:
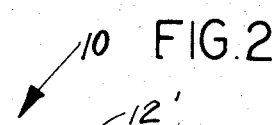
FIG. 2 is an end view of FIG. 1 shown in elevation.
Figure 3:
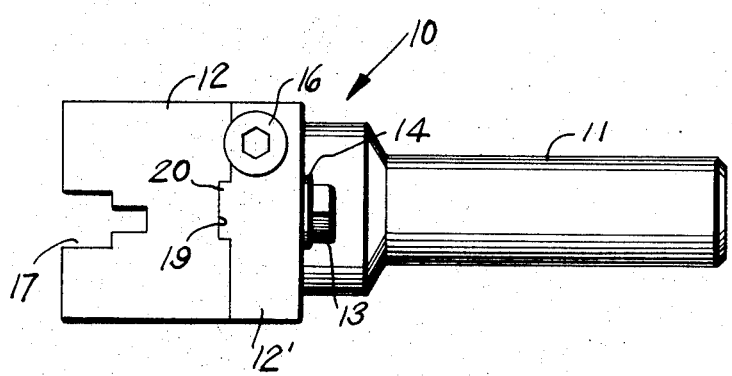
FIG. 3 is a side view of FIG. 1 shown in elevation.

According to this invention, a toolholder 10 is provided with an elongated metal shank 11 which is secured to jaw members 12 by means of plate 12'. Toolholder 10 is provided with a pair of threaded bolts 13 which bear against washers 14 on plate 12' and bolts 13 are free to be moved within slots 15 of plate 12' until bolts 13 are tightened downwards securing jaw members 12 to plate 12'. Plate member 12' is also provided with set screws 16, one on each end, the set screws 16 abutting with the outside edges of jaw members 12. Jaw members 12 of tool 10 are provided with grooves 17 and 18 for placement of cutting tools.

It will be noted that jaw members 12 are provided with grooves 19 for receiving the tongue portion 20 of plate 12', the grooves 19 providing constant alignment for various positions of jaws 12.

In use, the shank 11 of toolholder 10 is placed in a conventional manner within the machine for a cutting operation and the jaw members 12 are adjusted to various positions by loosening bolts 13 which are threaded into the jaw members 12 and the slots 15 of plate 12' allows for bolts 13 to be slid outwards or towards the center of toolholder 10.

It will be recognized that the cutting tool may be placed in various positions within toolholder 10 to accomplish a given purpose.

What I now claim is:

1. A toolholder for machines, comprising in combination a shaft, a rectangular plate member, a right-hand jaw and a left-hand jaw with fastener means to adjust the position of the jaws, said shaft being provided with a shoulder portion which abuts with one side of said plate member, and an extension of said shaft being received within said plate member and being secured by a suitable fastener, a pair of externally threaded bolts being screwed into the left-hand and right-hand members in order to properly position them with respect to said plate of said toolholder, and the portions near the heads of said bolts being slidable within elongated slots of said plate member so that proper position is attained whereupon said bolts are tightened down against washers carried by said bolts, said left-hand and said right-hand jaw members being provided with grooves which are offset from one another, each of said left-hand and right-hand jaw members being provided with a groove which receives a tongue of said plate member, and said plate member being provided with set screws on each opposite longitudinal end thereof, said set screws abutting with the outside edges of said jaw members.

References Cited

UNITED STATES PATENTS

| 2,402,650 | 6/1946  | Maffia  | 29—97     |
| 2,412,757 | 12/1946 | Smith   | 82—35     |
| 2,900,705 | 8/1959  | Walker  | 82—36 XR  |
| 3,178,973 | 4/1965  | Sweeny  | 82—35     |

LEONIDAS VLACHOS, Primary Examiner

U.S. Cl. X.R.

29—97